(12) United States Patent
Murray

(10) Patent No.: US 10,139,285 B2
(45) Date of Patent: Nov. 27, 2018

(54) FULLY-DIFFERENTIAL AMPLIFICATION FOR PYROMETRY

(71) Applicant: Advanced Energy Industries, Inc., Fort Collins, CO (US)

(72) Inventor: Donald F. Murray, Beaverton, OR (US)

(73) Assignee: Advanced Energy Industries, Inc., Fort Collins, CO (US)

( * ) Notice: Subject to any disclaimer, the term of this patent is extended or adjusted under 35 U.S.C. 154(b) by 301 days.

(21) Appl. No.: 14/757,702

(22) Filed: Dec. 23, 2015

(65) Prior Publication Data

US 2016/0178442 A1 Jun. 23, 2016

Related U.S. Application Data

(60) Provisional application No. 62/096,090, filed on Dec. 23, 2014.

(51) Int. Cl.
*G01J 5/24* (2006.01)
*G01J 1/44* (2006.01)

(52) U.S. Cl.
CPC .................. *G01J 5/24* (2013.01); *G01J 1/44* (2013.01); *G01J 2001/4406* (2013.01); *G01J 2001/446* (2013.01)

(58) Field of Classification Search
CPC ........ G01J 5/24; G01J 1/44; G01J 2001/4406; G01J 2001/446
See application file for complete search history.

(56) References Cited

U.S. PATENT DOCUMENTS

| 4,924,081 | A | 5/1990 | Arima et al. |
| 5,897,610 | A | 4/1999 | Jensen |
| 2001/0050333 | A1 | 12/2001 | Feng et al. |
| 2013/0299673 | A1* | 11/2013 | Williams .................. G01J 1/18 250/206 |

FOREIGN PATENT DOCUMENTS

| EP | 1575195 A2 | 9/2005 |
| EP | 2501036 A1 | 9/2012 |
| JP | 6479631 | 3/1989 |

(Continued)

OTHER PUBLICATIONS

Jacob, Riju, "International Search Report and Written Opinion re Application No. PCT/US2015/067640", dated Feb. 10, 2016, p. 10 Published in: AU.

(Continued)

*Primary Examiner* — Tony Ko
(74) *Attorney, Agent, or Firm* — Neugeboren O'Dowd PC

(57) ABSTRACT

This disclosure describes systems, methods, and apparatus for improving the signal-to-noise ratio, increasing sampling speed, and increasing the dynamic range of a pyrometer via improvements to the amplification section. In particular, single-stage non-differentiated amplifiers can be replaced with a differential amplifier circuit that increases gain without a proportional increase in noise. The differential amplifier circuit can comprise a pair of transimpedance amplifier circuits arranged in parallel that receive a differential current from a photo detector and generate a differential voltage output in response having a transconductance gain.

17 Claims, 14 Drawing Sheets

(56) References Cited

FOREIGN PATENT DOCUMENTS

| JP | H0851328 A | 2/1996 |
|---|---|---|
| JP | 2000217787 A | 8/2000 |
| JP | 2005216984 A | 8/2005 |
| TW | 242075 B | 10/2005 |
| WO | 03060447 A1 | 7/2003 |
| WO | 2006100662 A1 | 9/2006 |
| WO | 2009081961 A1 | 7/2009 |
| WO | 2009117102 A2 | 9/2009 |

OTHER PUBLICATIONS

Wittmann-Regis, Agnes, "International Preliminary Report on Patentability Re Application No. PCT/US2015/067640", dated Jul. 6, 2017, p. 7 Published in: CH.
Taiwan Intellectual Property Office, "Taiwan Office Action Re Application No. 104143541", dated Apr. 27, 2018, p. 6 Published in: TW.
TIPO, "Taiwan Office Action Re Application No. 104143541", dated Feb. 2, 2018, p. 15 Published in: TW.
Hirata, Yoshinori, "Official Japanese Office Action Regarding Japanese Patent Application No. 2017-533527", dated Jul. 24, 2018, p. 21 Published in: JP.
Hambach, Dirk, "European Extended Search Report and Opinion Regarding Application No. 15874368.2", dated Sep. 7, 2018, p. 10 Published in: EP.

\* cited by examiner

FULLY-DIFFERENTIAL AMPLIFICATION FOR PYROMETRY

CLAIM OF PRIORITY UNDER 35 U.S.C. § 119

The present application for patent claims priority to Provisional Application No. 62/096,090 entitled "USE OF A FULLY-DIFFERENTIAL FRONT-END, WITH REVERSE BIAS AND BLIND DETECTION SUPPORT TO ACHIEVE A HIGH-SPEED, LOW NOISE, LOW OFFSET, HIGH-GAIN PYROMETER INTERFACE" filed Dec. 23, 2014, and assigned to the assignee hereof and hereby expressly incorporated by reference herein.

FIELD OF THE DISCLOSURE

The present disclosure relates generally to optical pyrometry. In particular, but not by way of limitation, the present disclosure relates to systems, methods and apparatuses for an improved amplifier for use in optical pyrometry.

BACKGROUND

In manufacturing environments, measuring the temperature of an object without contact has proven to be a complex and daunting task. Objects in motion are often difficult to touch (e.g., molten sapphire), and objects that are too hot will damage the temperature sensor. The object of interest also may be easily damaged by contact, thereby precluding measurement of its temperature. Dependable means for gauging high temperatures have evolved over the centuries, from the primitive visual methods used by blacksmiths as they forged steel, to today's highly accurate means of industrial temperature measurement (e.g., optical pyrometry).

It is a well-known phenomenon that hot objects emit light. The hotter, the brighter. In fact, this phenomenon is one of the more important cornerstones of many modern technologies. Among them is radiometric temperature measurement, otherwise known as optical pyrometry.

The essence of the system is that an object of interest, or target, is viewed with some type of optics. The object is imaged on an electronic detector of some type that has been accurately calibrated to produce a known relationship between input (light intensity) and output (temperature reading). The output is typically routed into a control system and used as feedback to adjust the process in real time.

Optical pyrometers often use an amplifier to increase a voltage representing the detected optical signature of the target being measured. These amplifiers introduce various challenges to optical pyrometry that have yet to be adequately addressed. There is therefore a need in the art for an improved amplification stage for an optical pyrometer.

SUMMARY OF THE DISCLOSURE

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

An aspect of the disclosure may be characterized as a fully-differential amplifier circuit for amplifying an optical signal in a pyrometer including a first system input configured for coupling to an anode of a primary photo detector and a second system input configured for coupling to a cathode of the primary photo detector. The amplifier circuit also includes a transimpedance differential amplifier stage that includes a primary biasing circuit configured to bias the primary photo detector with between 0V and a reverse bias, and having a first and second output. The transimpedance differential amplifier stage also includes a first transimpedance amplifier circuit having a first current input and a first transimpedance voltage output, wherein the first current input is coupled to the first system input, a first bias voltage input is coupled to the first output of the primary biasing circuit, and a first voltage at the first voltage transimpedance output is proportional to photo current, ip. The transimpedance differential amplifier stage additionally includes a second transimpedance amplifier circuit having a second current input and a second transimpedance voltage output, wherein the second current input is coupled to the second system input, a second bias voltage input is coupled to the second output of the primary biasing circuit, and a second voltage at the second voltage transimpedance output is proportional to the photo current, ip, passing between the second and first system inputs. The primary biasing circuit is coupled to the first and second transimpedance amplifier circuits to cause a 0V to a reverse bias to exist across the primary photo detector, and a primary differential output voltage, v1, being a difference between the first and second transimpedance voltage outputs, is configured for conversion to a temperature or reflectance value in a processor.

Another aspect may be characterized as a pyrometer system comprising a primary photo detector and a differential amplifier circuit comprising a pair of transimpedance amplifiers coupled to the primary photo detector and having two differential voltage outputs proportional to a photo current, ip, generated by the primary photo detector, but having different gains. The system also includes a first analogue-to-digital converter coupled to a first of the two differential voltage outputs, and configured to transform a first differential voltage output into a corresponding digital value, and having a first digital output that provides the corresponding digital value to a processor. In addition, the system includes a a second analogue to digital converter coupled to a second of the two differential voltage outputs, and configured to transform a second differential voltage output into a corresponding digital value, and having a second digital output that provides the corresponding digital value to the processor. The processor coupled to the first and second digital outputs, having a selector coupled to the first and second digital outputs and configured to select which of the first and second digital outputs is to be processed by the processor, the processor configured to transform a selected of the first and second digital outputs into a temperature or reflectance value, and having an output that provides the temperature or reflectance value.

BRIEF DESCRIPTION OF THE DRAWINGS

Various objects and advantages and a more complete understanding of the present invention are apparent and more readily appreciated by referring to the following detailed description and to the appended claims when taken in conjunction with the accompanying drawings:

DETAILED DESCRIPTION

The present disclosure relates generally to optical pyrometry. In particular, but not by way of limitation, the present disclosure relates to systems, methods and apparatuses for an improved amplifier for use in optical pyrometry The word "exemplary" is used herein to mean "serving as an example, instance, or illustration." Any embodiment described herein as "exemplary" is not necessarily to be construed as preferred or advantageous over other embodiments.

The term "differential amplifier circuit" is used herein to mean an amplifier having two driven inputs.

The term "fully differential amplifier circuit" is used herein to mean a type of electronic amplifier that amplifies the difference between two input voltages but suppresses any voltage common to the two inputs. [1] It is an analog circuit with two inputs and one output in which the output is ideally proportional to the difference between the two voltages.

The term "amplification stage" is used herein to refer to a circuit or system having one or more inputs and one or more outputs that are proportional to the one or more inputs. An amplification stage can include one or more amplifiers such as operational amplifiers, BJTs, MOSFETS, and others.

The term "biasing circuit" is used herein to refer to a circuit structured to apply a bias to another portion of a circuit or system.

The term "differential amplifier stage" is used herein to refer to a circuit that has two driven inputs and a differential output.

The term "differential input" and "differential output" are used herein to indicate that an input or output has two legs and a differential signal between the two legs.

The terms "blind photo detector," "blind photo current," "blind bias," and "blind stage" all refer to aspects of an amplifier circuit that are used to account for or subtract a leakage current from measurements of a primary photo detector.

The term "coupled to" can refer to a direct connection between components, such as via an uninterrupted wire or lead or can refer to an indirect connection between components, such as via another component or circuit. For instance, two capacitors can be coupled to each other through a diode or inductor.

Figure 1:
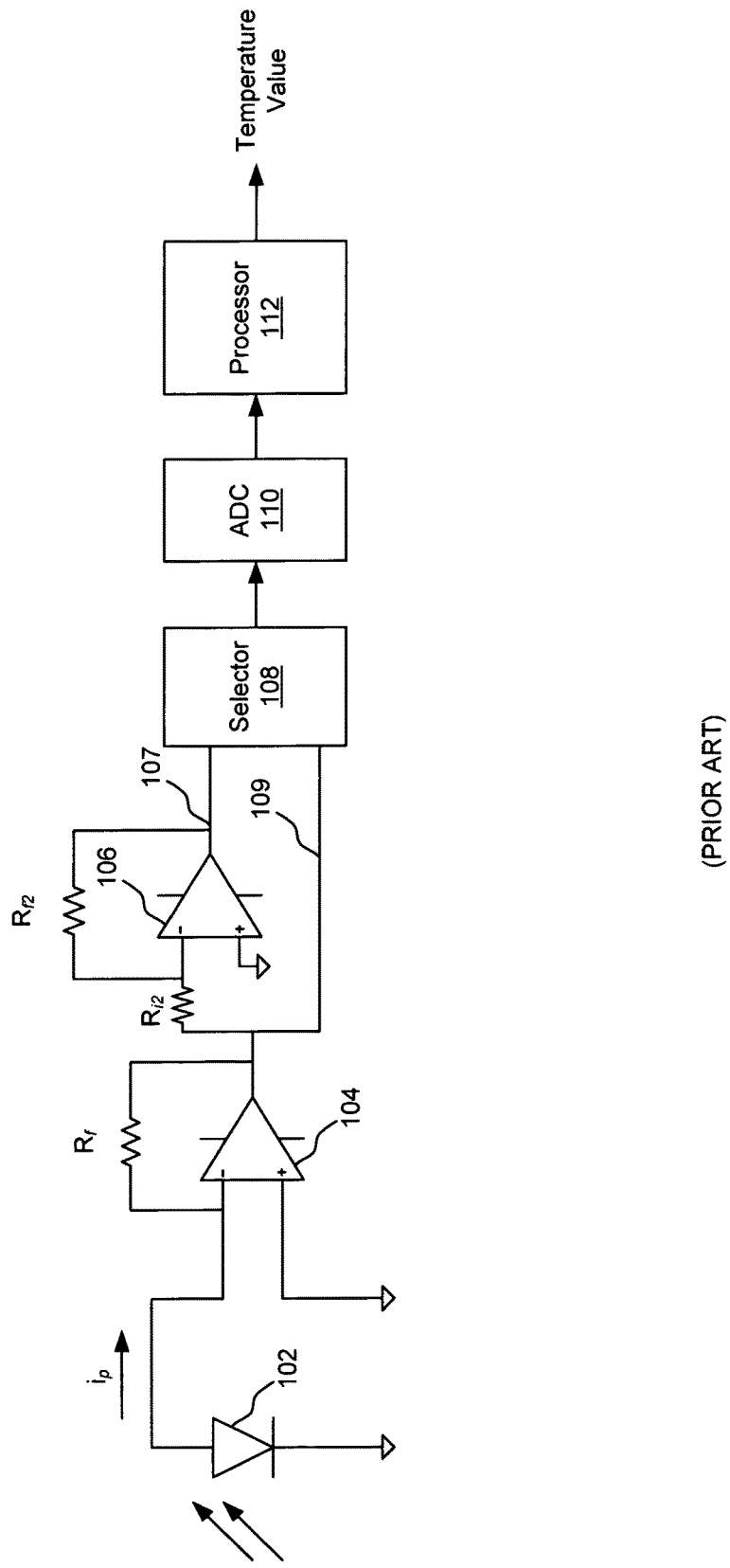
FIG. 1 shows a traditional pyrometer system having a photo detector and a transimpedance amplifier having a feedback resistance $R_f$, where gain is proportional to the feedback resistance, $R_f$.

Traditional optical pyrometers are plagued by low signal-to-noise ratios, errors caused by leakage current in the photo detector, and are not able to handle the wide range of emission amplitudes seen in pyrometry. For instance, because photo currents can be as low as $10^{-13}$ amps, significant amplification is required. With the single-stage amplifiers currently used in pyrometry, the gain needed to detect such small signals requires a very large feedback resistance, $R_f$ (see FIG. 1 for a traditional single-stage amplification system). FIG. 1 shows a traditional pyrometer system having a photo detector 102 and a transimpedance amplifier 104 having a feedback resistance $R_f$, where gain is proportional to the feedback resistance, $R_f$. One can see that where large gain is required, such as in pyrometry situations, $R_f$ often must be very large in order to see such small signals. However, a large $R_f$ also corresponds to high noise and slow response. Thus, use of a single-stage transimpedance amplifier such as 104 is inherently limited by high noise, insufficient gain, or slow response.

The output of the transimpedance amplifier 104 is passed in two directions: (1) to a further amplification stage 106; or (2) to an electrical selector 108 without further gain. One should note that gain is proportional to the size of the feedback resistor $R_f$, which in turn causes large noise in the amplified signal. Thus, to achieve the necessary gain to handle small photo current, $i_p$, this system introduces excessive noise relative to the output voltage.

After toiling with various modifications to traditional amplification schemes such as that illustrated in FIG. 1, the inventor recognized that these problems might be inherent to the single-stage non-differentiated amplifier (e.g., 104) traditionally used in the art. Although pyrometer designers have always used single-stage non-differentiated amplifiers, the inventor wondered if an entirely different amplification structure might overcome what the inventor considered inherent limitations of single-stage non-differentiated amplification in pyrometers.

Differential amplifiers have not previously been used in pyrometers since differential amplifiers are typically used where measurement ranges are quite narrow (i.e., a small dynamic range of measurements are needed) and high-speed in nature. In pyrometry, photo currents can vary between $10^{-13}$ amps and $10^{-6}$ amps (seven orders of magnitude), and thus differential amplifiers are not thought to be suitable for this type of detection. Additionally, differential amplification devices introduce added components and added cost and complexity to the amplification system.

Despite these drawbacks, the inventor modeled a differential amplifier circuit for measuring photo current in a pyrometer and unexpectedly saw promising results (i.e., lower noise, a wider dynamic range, and a faster response sampling rate than had been achieved in single-stage non-differential amplification stages).

The inventor also recognized that detector capacitance could be decreased by increasing a reverse bias on the photo detector to lower the noise (e.g., this moves the noise zero out). The downside of such an adjustment is that the photo detector sees increased leakage current as a function of increased reverse bias. Leakage current is temperature dependent, and thus at the high temperatures that pyrometers typically operate at (since they are often affixed to or nearby hot processing chambers), it is difficult to factor out leakage currents with software based corrections alone. To account for leakage current, a "blind" bias was applied to a "blind" photo detector, isolated from the optical/IR emissions source. In this way, currents from the blind photo detector are expected to represent only the leakage currents of the primary detector, and if the bias applied to the blind photo detector is the same as the bias applied to the primary photo detector, then the current from the blind photo detector should be a worthy estimate of leakage current in the primary photo detector. Measurements from the biased blind photo detector can then be subtracted from measurements of the primary photo detector to limit the influence of leakage current on the measured temperature.

Another problem with traditional pyrometry amplification schemes can also be seen in FIG. 1 in that where different selectable gains are desired, in order to deal with wide swings in signal strength, a second gain stage 106 can be implemented such that high gain 107 and low gain 109 outputs exist. A selector 108, typically an electrical switch, selects which of the outputs 107, 109 is passed to an analog-to-digital converter 110 (ADC). During a processing run temperatures of the target being measured can change so rapidly/drastically that the switching between the high gain output 107 and the low gain output 109 can cause a perturbations in the data output.

To address such perturbations in the data, the inventor has implemented a pair of ADCs 204, 206 (see FIG. 2), each receiving a differential output from a fully differential amplifier circuit 202 (also referred to as a "front-end"), and each providing a digital output 216, 218 to a selector 208 of a processor 210. Unlike traditional methods where only one amplified signal would reach the processor, the inventor's solution enables both digital outputs 216, 218 to reach the processor, thus enabling selection between gain stages to be performed in software and to be performed at any point in time. In this way, perturbation does not occur when the selector 208 switches between the outputs 216, 218.

Discussion now turns to more detailed descriptions of the systems, methods, and apparatus illustrated in FIGS. 2-12.

Figure 2:
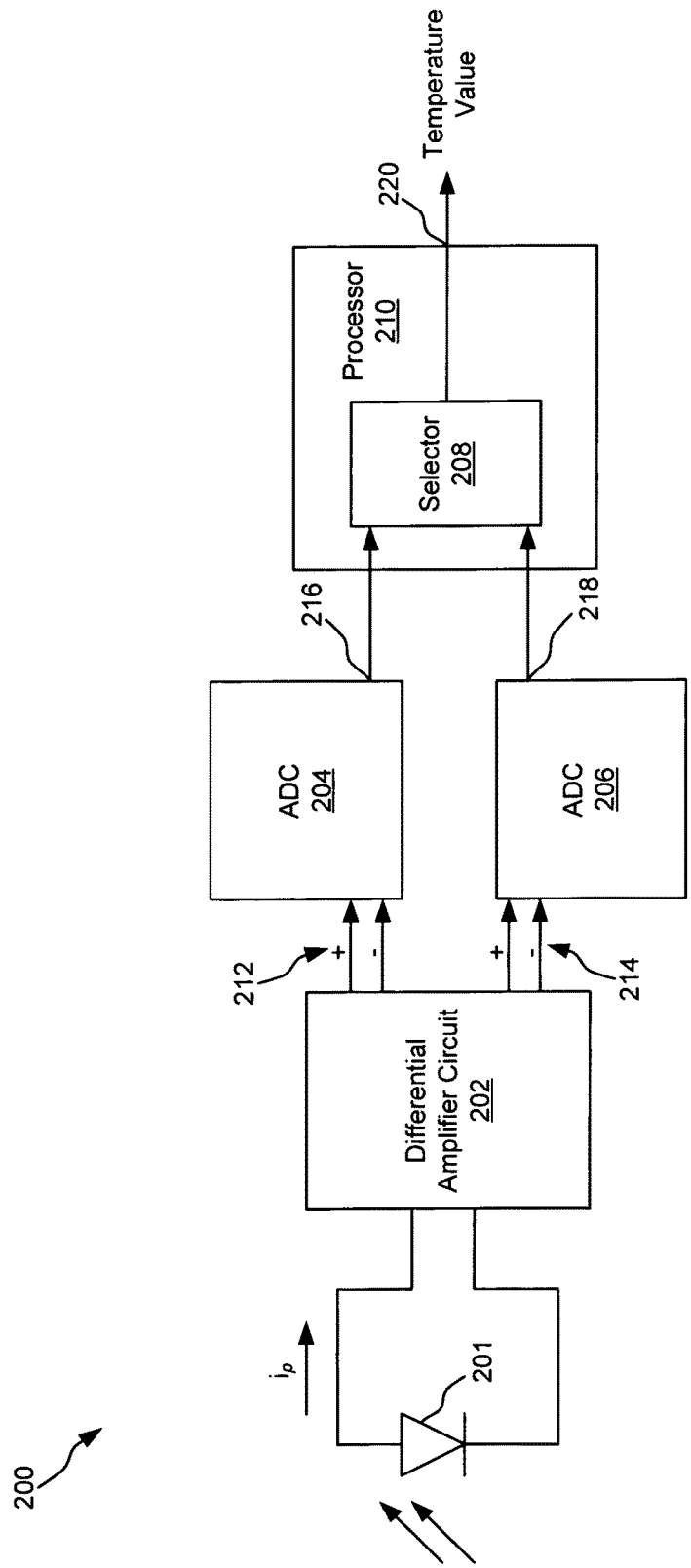
FIG. 2 illustrates an embodiment of a pyrometer system.

FIG. 2 illustrates an embodiment of a pyrometer system 200. The system 200 can include a primary photo detector 201 that may or may not be biased, and if biased, it can be biased between 0V to a reverse bias where no limit is placed on the magnitude of the reverse bias. The system 200 can also include a differential amplifier circuit 202 that can include a pair of transimpedance amplifiers configured from operation amplifiers. The pair of transimpedance amplifiers can be configured for coupling to the primary photo detector 201 so that the transimpedance amplifiers convert a photo current, $i_p$, through the primary photo detector 201 to a voltage at an output of each of the transimpedance amplifiers. Since the transimpedance amplifiers are arranged in parallel, their output can be a differential voltage providing less noise than a single-stage non-differentiated amplifier of equivalent gain (or greater gain per the same noise level or a better signal-to-noise ratio). The differential amplifier circuit 202 can have two differential voltage outputs 212, 214 that are proportional to the photo current, $i_p$, generated by the primary photo detector 201. However, the two differential voltage outputs 212, 214 can have different gains.

Each of the two differential voltage outputs 212, 214 can be coupled to a respective analogue-to-digital converter (ADC), such as the first ADC 204 and the second ADC 206. The first ADC 204 can be configured to transform the first differential voltage output 212 into a corresponding digital value. The first ADC 204 can also have a first digital output 216 that provides the corresponding digital value to the processor 210.

The second ADC 206 can be configured to transform the second differential voltage output 214 into a corresponding digital value. The second ADC 206 can also have a second digital output 218 that provides the corresponding digital value to the processor 210.

The processor 210 can be coupled to the first and second digital outputs 216, 218. The processor 210 can have a selector 208 (e.g., a switch) coupled to the first and second digital outputs 216, 218. The selector 208 can be configured to select which of the first and second digital outputs 216, 218 is to be processed by the processor 210. Further, the processor 210 can be configured to transform a selected of the first and second digital outputs 216, 218 into a temperature or reflectance value, and can have an output 220 that provides the temperature or reflectance value. Typically, reflectance values are used to calibrate temperature measurements by indicating a reflectivity of a target's surface. This calibration can then be used to improve the accuracy of temperature measurements. Hence, measurements for both temperature and reflectance can be made by the system 200.

The differential amplifier circuit 202 can include a primary bias circuit arranged to cause a bias on the primary photo detector 201. This bias can range from 0V to a reverse bias limited only by the detector and dynamic range required. A greater reverse bias lowers a capacitance across the primary photo detector 202 and lowering noise and enabling a higher sampling rate. However, higher reverse bias also means greater leakage current, so with increased speed comes the need to handle and factor out increased leakage currents. Such currents are especially troublesome in this application since they increase with temperature and temperatures of the system 200 are typically between 35° C. and 45° C. (significantly higher than ambient).

Figure 3:
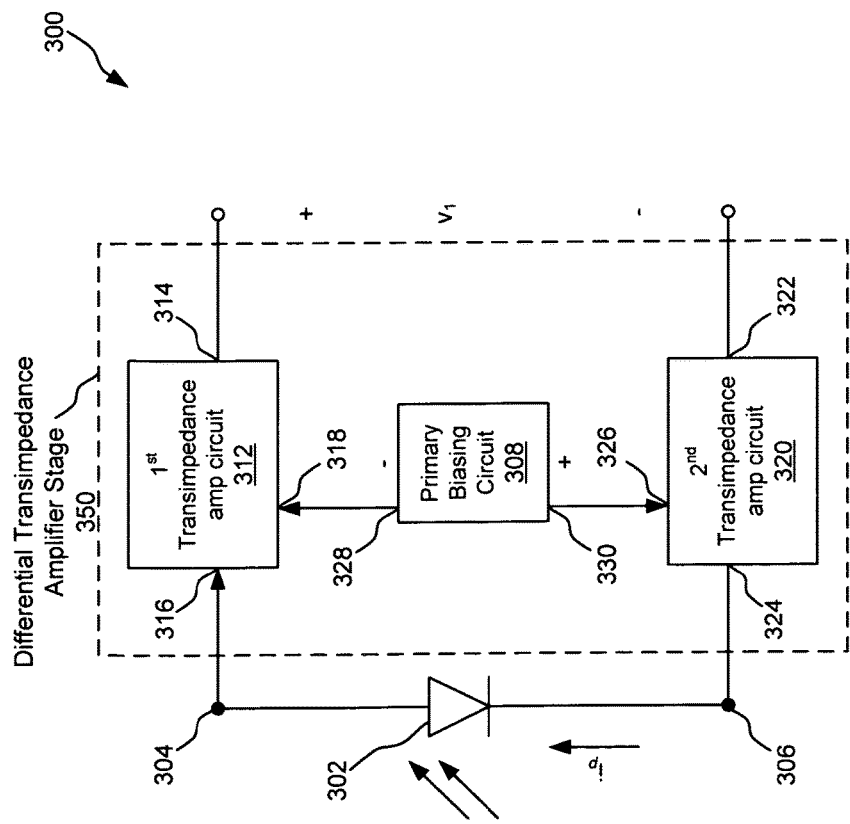
FIG. 3 illustrates an embodiment of a fully-differential amplifier circuit fox amplifying an optical signal in a pyrometer.

FIG. 3 illustrates an embodiment of a fully-differential amplifier circuit 300 for amplifying an optical signal in a pyrometer. This circuit 300 can be high-speed, high-gain, with low offset, a high dynamic range, a combination of attributes that has proven impossible to achieve in prior art pyrometry amplification schemes. The system 300 achieves this via a number of structural features describes below. For one, the system 300 can include a first system input 304 and a second system input 306 configured to couple to an anode and cathode, respectively, of a primary photo detector 302. When the first and second system inputs 304, 306 are be coupled to the primary photo detector 302, a photo current, $i_p$, passes between the second and first system inputs 306, 304. In other words, photo current, $i_p$, runs opposite to the polarity of the photo detector 302 as seen in FIG. 3.

The circuit 300 can also include a differential transimpedance amplification stage 350. This first amplification stage 350 has inputs configured to receive the photo current, $i_p$, and convert the photo current, $i_p$, to a differential voltage, $v_t$, with some transimpedance gain (gain that also involves a conversion from current to voltage). The use of a differential transimpedance amplification stage 350 allows at least a 2× gain factor as compared to a single amplifier circuit, for similar noise and dynamic response performance. For instance, where a single transimpedance amplifier circuit converts a $10^{-10}$ Amp of photo current, $i_p$, to a 1V output, the illustrated differential setup produces +1V at the output 314 of the first transimpedance amplifier circuit 314 and a −1V output at the output 322 of the second transimpedance amplifier circuit 320. Hence the differential voltage, $v_1$, is 2V, or twice the gain that a single amplifier could achieve. Yet the noise penalty and dynamic response for this increased gain is less than that in a single-ended amplifier. Accordingly, the differential transimpedance amplification stage 350 produces a higher signal-to-noise ratio than prior art pyrometry amplification stages.

The differential transimpedance amplification stage 350 can include a primary biasing circuit 308 configured to bias the primary photo detector 302 via first and second transimpedance amplifier circuits 312, 320. The primary biasing circuit 308 is not required, and in some embodiments can be replaced with a connection to ground. Where a bias is applied it can range between 0V and some reverse bias. A polarity of the primary biasing circuit 308 is shown such that a reverse bias exists across the primary photo detector 302. The primary biasing circuit 308 can have a first and second output 328, 330.

The differential transimpedance amplification stage 350 can also include a first transimpedance amplifier circuit 312 having a first current input 316 and a first transimpedance voltage output 314. Details of one embodiment of the transimpedance circuits 312, 320 can be seen in FIGS. 7 and 8. The first current input 316 can receive the photo current, $i_p$, and the first transimpedance amplifier circuit 312 can convert this current to a first output voltage seen at the first transimpedance voltage output 314.

The first current input 316 can be coupled to the first system input 304 and the first bias voltage input 318 can be coupled to the first output 328 of the primary biasing circuit 308. In other words, the first transimpedance amplifier circuit 312 can have two inputs—one for current form the primary photo detector 302, and one for a reference voltage equal to a bias at the first output 328 of the primary biasing circuit 308.

A first output voltage can be seen at the first transimpedance voltage output 314, and this first output voltage can be proportional to the photo current, $i_p$.

The differential transimpedance amplification stage 350 can also include a second transimpedance amplifier circuit 320 having a second current input 324 and a second transimpedance voltage output 322. The second current input 324 can receive the photo current, $i_p$, and the second transimpedance amplifier circuit 320 can convert this current to a second output voltage seen at the second transimpedance voltage output 322.

The second current input 324 can be coupled to the second system input 306 and the second bias voltage input 326 can be coupled to the second output 330 of the primary biasing circuit 308. In other words, the second transimpedance amplifier circuit 320 can have two inputs—one for current sourced from the primary photo detector 312 flowing in an equal and opposite direction to that in the transimpedance amplifier, and one for a reference voltage equal to a bias at the second output 330 of the primary biasing circuit 308.

A second output voltage can be seen at the second transimpedance voltage output 324, and this second output voltage can be proportional to the photo current, $i_p$, but having an opposite polarity to the first output voltage at the first transimpedance voltage output 314. As a result, a differential voltage, $v_1$, has a magnitude that is twice the first or second output voltage and thus has greater gain than either transimpedance amplifier circuit could provide alone.

The primary biasing circuit 308 can be coupled to the first and second transimpedance amplifier circuits 312, 320 so as to cause a bias having a value of between and including 0V to a reverse bias to exist across the primary photo detector 302.

The differential output voltage, $v_1$, which can also be called a primary differential output voltage, can be the difference between the first and second transimpedance voltage outputs 314, 322. Further, this differential voltage, $v_1$, can be configured for conversion to a temperature or reflectance value in a processor.

In an embodiment, the primary biasing circuit 308 can comprise two voltage sources, each configured to apply an opposing bias to a side of the primary photo detector 302. One such embodiment can be seen in FIG. 9 with particular reference to the anode bias and the cathode bias.

Figure 4:
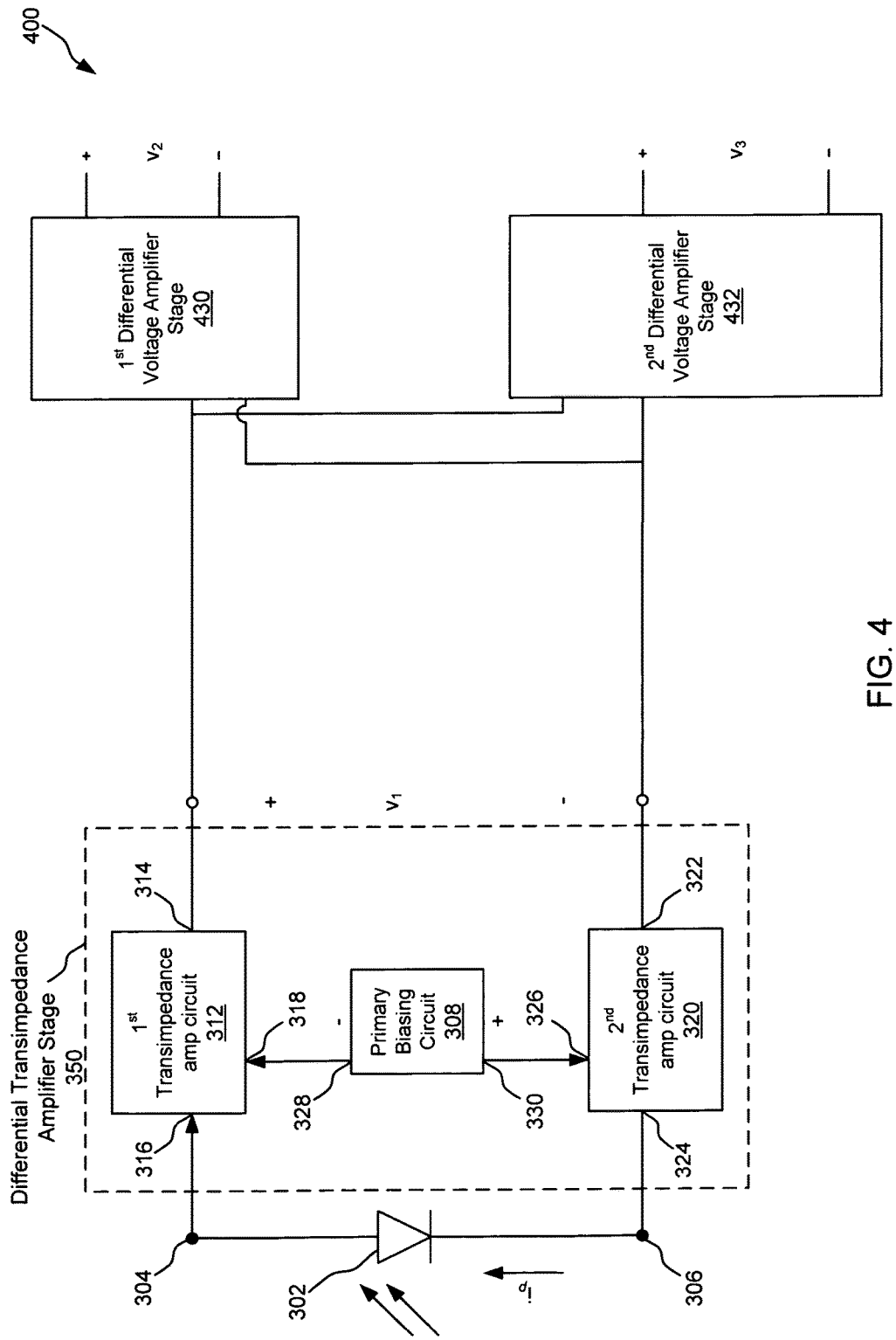
FIG. 4 illustrates another embodiment of a fully-differential amplifier circuit with additional gain stages providing two levels of gain for the differential output of the differential transimpedance amplification stage discussed in FIG. 3.

FIG. 4 illustrates another embodiment of a fully-differential amplifier circuit 400 with additional gain stages providing two levels of gain for the differential output of the differential transimpedance amplification stage 350 discussed in FIG. 3. The amplifier circuit 400 can include two or more differential voltage amplifier stages 430, 432 arranged in parallel. In other words, each of the differential output voltages from the differential transimpedance amplifier stage 350 can be provided to each of the two or more differential voltage amplifier stages 430, 432. While only two differential voltage amplifier stages 430, 432, three, four, or more differential amplifier stages can be provides where each stage can receive the differential output voltage $v_1$. Each of these stages can have a different gain and selection between their outputs can enable different gains to be electronically selected so as to handle different photo detector currents, $i_p$. Each of the two or more differential voltage amplifier stages 430, 432 can have a differential voltage output, $v_2$ and $v_3$. Each of these differential outputs $v_2$ and $v_3$ can be proportion to the first differential voltage $v_1$ provided as an input to each of the differential voltage amplifier stages 430, 432.

Figure 5:
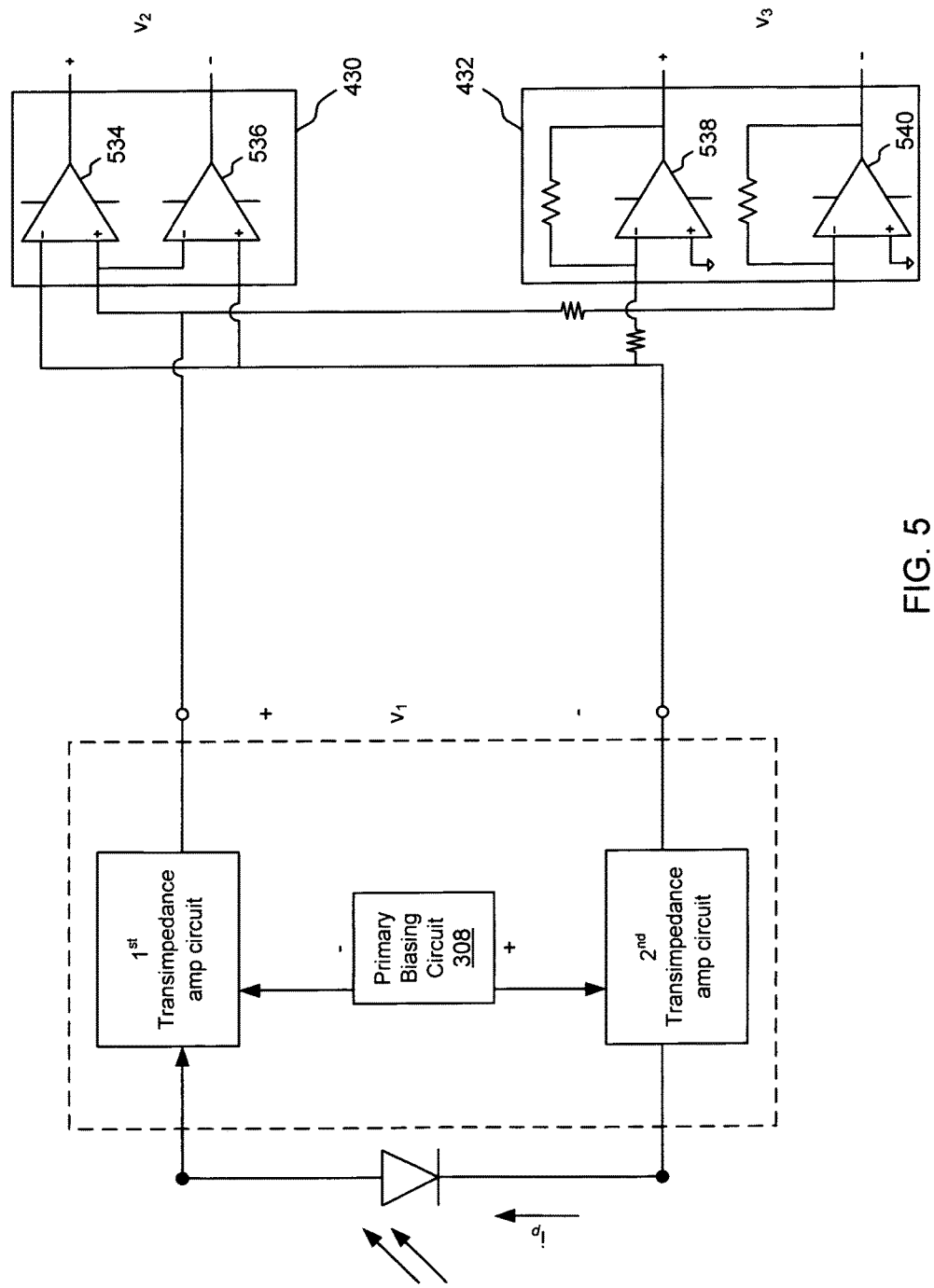
FIG. 5 illustrates another embodiment of a fully-differential amplifier circuit.
Figure 6:
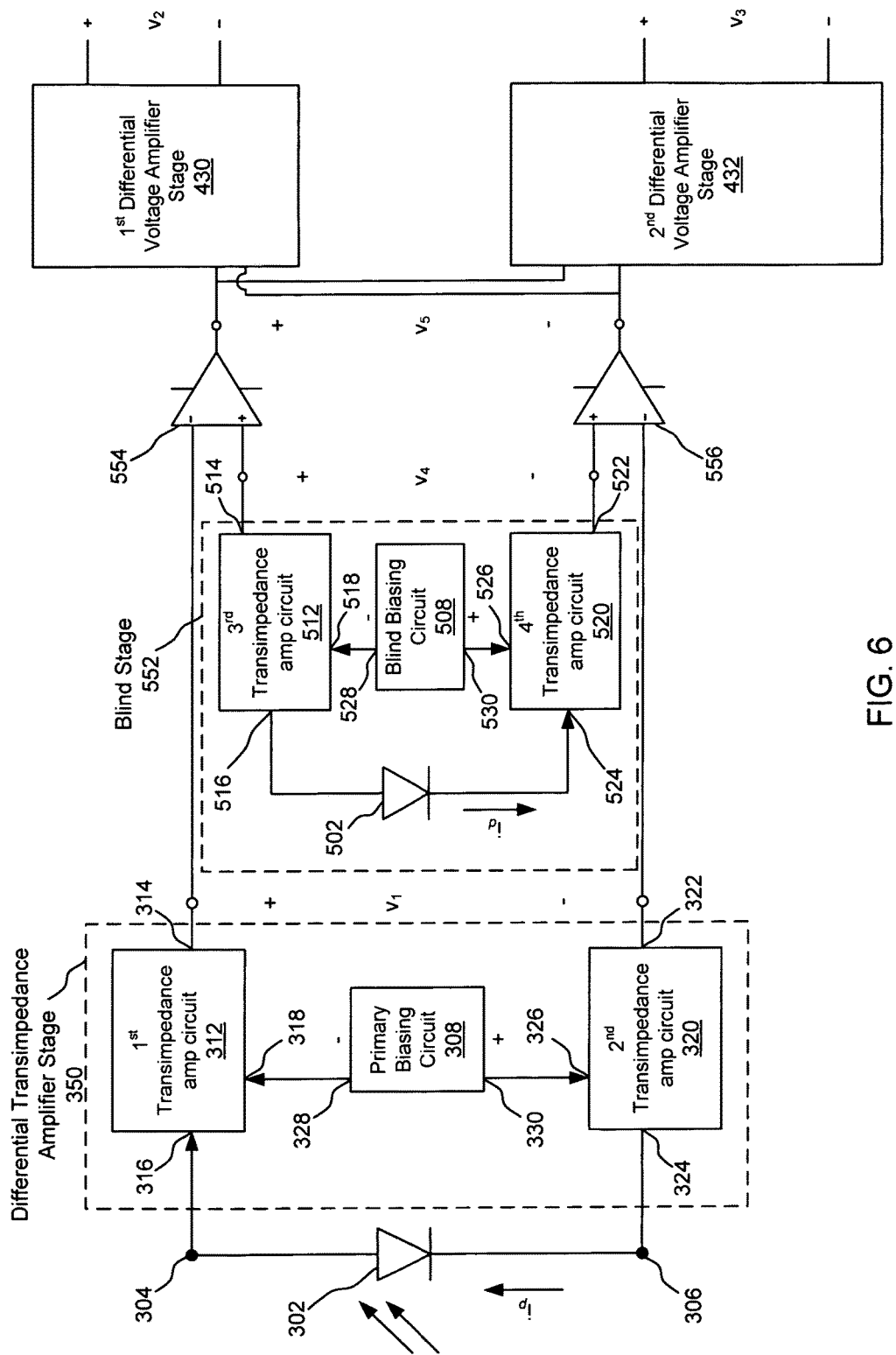
FIG. 6 illustrates yet another embodiment of a fully-differential amplifier circuit.

In an embodiment, each of the differential voltage amplifier stages 430, 432 can comprise two differential voltage amplifiers arranged in parallel. One such configuration of such pairs of amplifiers can be seen in FIG. 5. However, this arrangement is for illustration purposes only and does not limit the scope of various configurations and types of amplifiers that can be implemented within each of the two differential voltage amplifier stages 430, 432. In FIG. 5 the first differential amplifier stage 430 comprises two differential amplifiers 534, 536 (e.g., differential instrumentation amplifiers) having internal feedback, while the second differential voltage amplifier stage 432 comprises two single-ended amplifiers 538, 540 having external feedback. The first differential amplifier stage 430 provides higher gain than the second differential voltage amplifier stage 432. One way that this happens is by providing the full first differential voltage, $v_1$, to both of the differential voltage amplifiers 534, 536 so that the differential voltage output, $v_2$, of the first differential amplifier stage 430 already sees a 2× gain as compared to use of a single amplifier. Further, an inverted version of the first differential voltage output $v_1$ is provided to one of the two differential amplifiers 534, 536 (e.g., a lower leg of $v_1$ is provided to the non-inverting input of amplifier 534 and to the inverting input of amplifier 536). This inverting of the inputs enables a further gain boost over a parallel pair of differential amplifiers where the inputs were not inverted. Thus, the overall gain of the first differential amplifier stage 430 is something around 4× of that of a single-ended amplifier.

The second differential voltage amplifier stage 432 does not provide this same level of gain in part because each leg of v1 is only provided to one of the amplifiers 538, 540 within the second differential voltage amplifier stage 432. Further, the amplifiers 538, 540 are not differential amplifiers since the non-inverting input of both is grounded. One can therefore see that the differential output of the first differential voltage amplifier stage 430 has more gain than that of the second differential voltage amplifier stage 432. Because of these different gains, the voltage output v2 might be selected where the photo current $i_p$ is low, and the voltage output v3 might be selected where the photo current $i_p$ is high.

Selection of the voltage output to process can be performed within a processor, and in particular by a selector of a processor. For instance, the differential voltage outputs of the first and second differential voltage amplification stages 430, 432 can be configured for coupling to a processor, such as processor 210. The processor 210 can have a selector 208 that can be implemented in software or firmware running on the processor 210. The selector 208 can be configured to select between outputs of the two or more differential voltage amplifier stages 430, 432, such that selection of amplification gain can be performed during data collection without use of an electrical switch (compare to electrical selector 108 in FIG. 1), and therefore without perturbation in a data stream.

As noted earlier, leakage current in the primary photo detector 302 can skew measurements of the photo current $i_p$ attributable to the target. This is especially true where the primary photo detector 302 experiences above-ambient temperatures, and when used in pyrometry settings, above-ambient temperatures are the norm. Thus, leakage current is exacerbated. To deal with this heightened leakage current, FIG. 6 proposes measuring a blind photo current across a blind photo detector 502 and subtracting the resulting photo current, or dark offset current, id, from that measured through the primary photo detector 302. In other words, by isolating the blind photo detector 502 from substantially all emissions sources (e.g., effectively putting the blind photo detector 502 in a dark enclosure), any photo current or dark offset current in the blind photo detector 502 can be attributed to leakage current. If the blind photo detector 502 and any bias applied across the blind photo detector 502 are matched to the primary photo detector 302 and the bias applied to the primary photo detector 302, then the dark offset current, $i_d$, will represent an estimate of leakage current in the primary photo detector 302. In other words, $i_d$ represents a portion of $i_p$ that is leakage current. By subtracting $i_d$ from $i_p$, one can arrive at a photo current for the primary photo detector 302 adjusted or corrected for leakage current (i.e., with leakage current removed froth $i_p$). In practice, since the differential transimpedance amplification stage 350 generates a differential voltage $v_1$ as an indication of the primary photo current, $i_p$, subtracting the dark offset current, $i_d$, means generating a corresponding differential voltage output, $v_4$ (also referred to as a blind differential voltage output), and subtracting $v_4$ from $v_1$. Equation (1) therefore represents a differential voltage indicator, $v_5$, of the primary photo current partially-corrected for dark offset current $i_d$.

$$v_5 = v_1 - v_4 \quad \text{(Equation 1)}$$

To arrive at $v_5$ a differential voltage $v_4$ can be obtained for the dark offset current, $i_d$, and then $v_4$ can be subtracted from $v_1$ via a pair of comparators 554, 556. While illustrated as differential operational amplifiers, the pair of comparators 554, 556 are not limited to differential operation amplifiers, but rather can include any circuits or devices capable of subtracting voltages.

Figure 9:
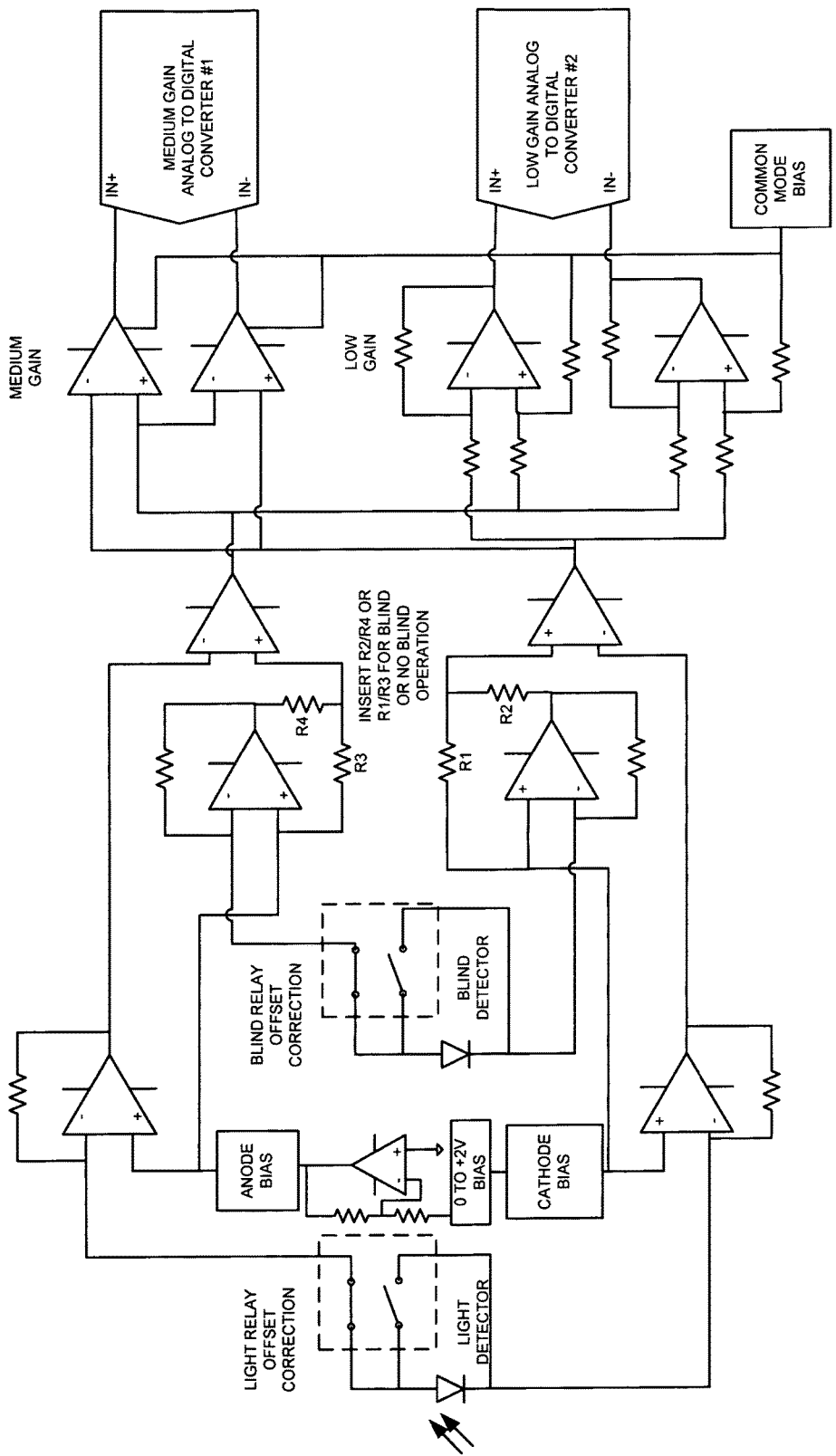
FIG. 9 illustrates a further embodiment of a differential front-end providing two differential voltage signals to a pair of analog-to-digital converters.

The dark offset current, $i_d$, can be turned into the differential voltage, $v_4$, via a blind stage 552. The blind stage 552 is essentially another differential transimpedance amplification stage 350, but measuring a blind photo detector 502 that is isolated from substantially all emissions and further where a bias across the blind photo detector 502 is opposite in polarity to that applied across the primary photo detector 302 (assuming any bias is applied). Thus, like the differential transimpedance amplification stage 350, the blind stage 552 includes a third transimpedance amplifier circuit 512, a fourth transimpedance amplifier circuit 520, and a blind biasing circuit 508. The blind photo detector 502 can be substantially identical to the primary photo detector 302. The blind biasing circuit 508 can be coupled to a voltage input 518 of the third transimpedance amplifier circuit 512, and coupled to a voltage input 526 of the fourth transimpedance amplifier circuit 520. The third transimpedance amplifier circuit 512 can have a current input 516 coupled to an anode of the blind photo detector 502, and the fourth transimpedance amplifier circuit 520 can have a current input 524 coupled to a cathode of the blind photo detector 502. Because the transimpedance amplification circuits 512, 520 attempt to equalize voltages of the current inputs 516, 524 relative to the voltage inputs 518, 526, the voltages of the current inputs 516, 524 tend toward the bias applied by the blind biasing circuit 508. In other words, if the blind biasing circuit 508 applies a +1V bias to the voltage input 518 of the third transimpedance amplification circuit 512, then the current input 516 will tend toward a +1V bias. In this way, the blind biasing circuit 508 can indirectly bias the blind photo detector 502 just as the primary biasing circuit 308 indirectly biases the primary photo detector 302. The blind biasing circuit 508 can apply an equal magnitude bias to the blind photo detector 502 as the primary biasing circuit 308 applies to the primary photo detector 302. One way to implement such a scheme is to source the primary and blind biasing circuits 308, 508 from the same bias source. As an example, FIG. 9 shows an embodiment where a single source is used for both biases. As noted above, the dark offset current, $i_d$, provides an estimate of leakage current in the primary photo detector 302.

The comparators 554, 556 can each have a pair of differential inputs and can each be coupled to the primary differential voltage output, $v_1$, and the blind differential voltage output, $v_4$. The comparators 554, 556 can have polarities such that a differential voltage output, $v_5$, of the pair of comparators 554, 556 is equal to a difference between the primary differential voltage output, $v_1$, and the blind differential voltage output, $v_4$. In other words, the comparators 554, 556 perform Equation 1.

Figure 7:
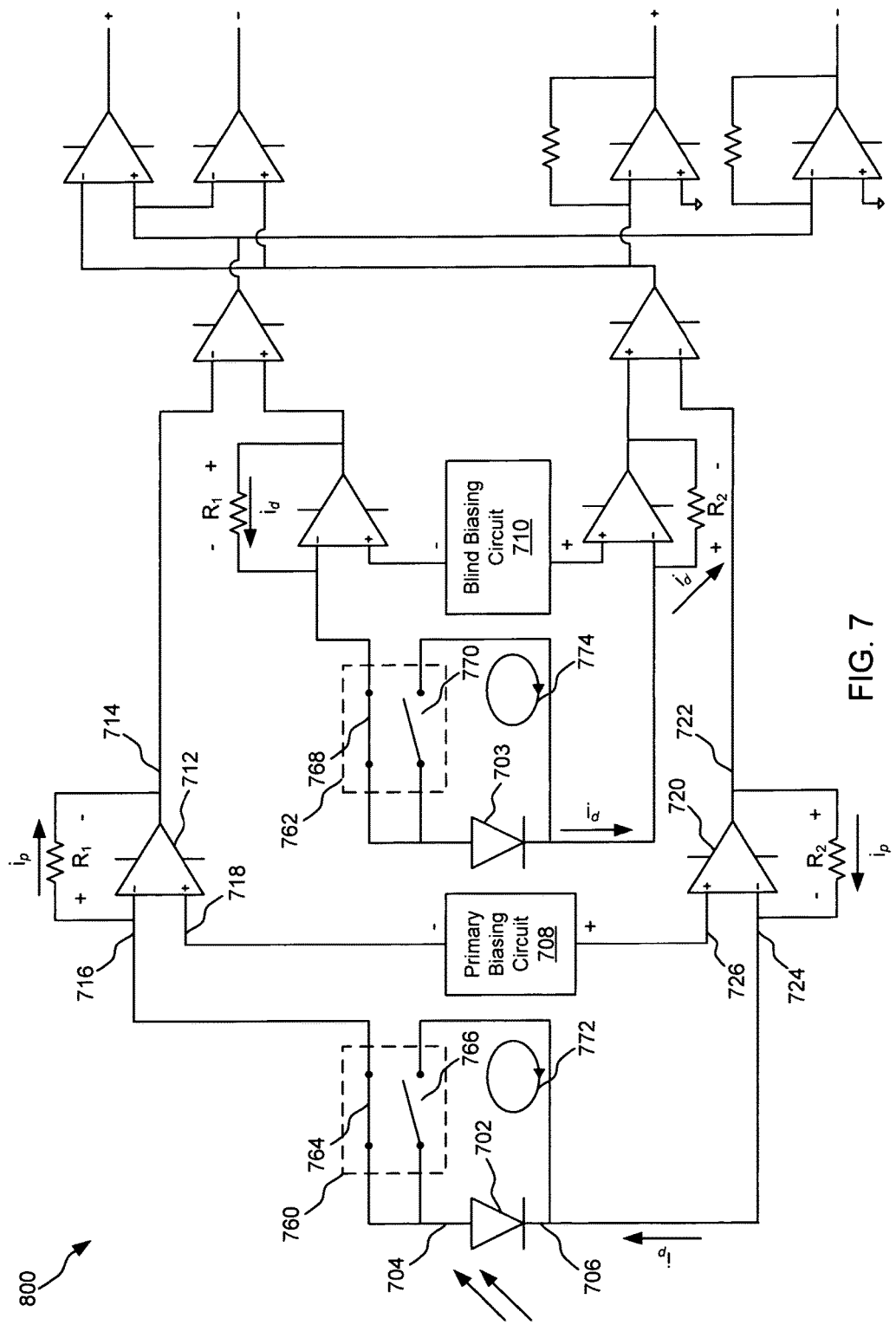
FIG. 7 illustrates a detailed view of a fully differential amplifier circuit.
Figure 8:
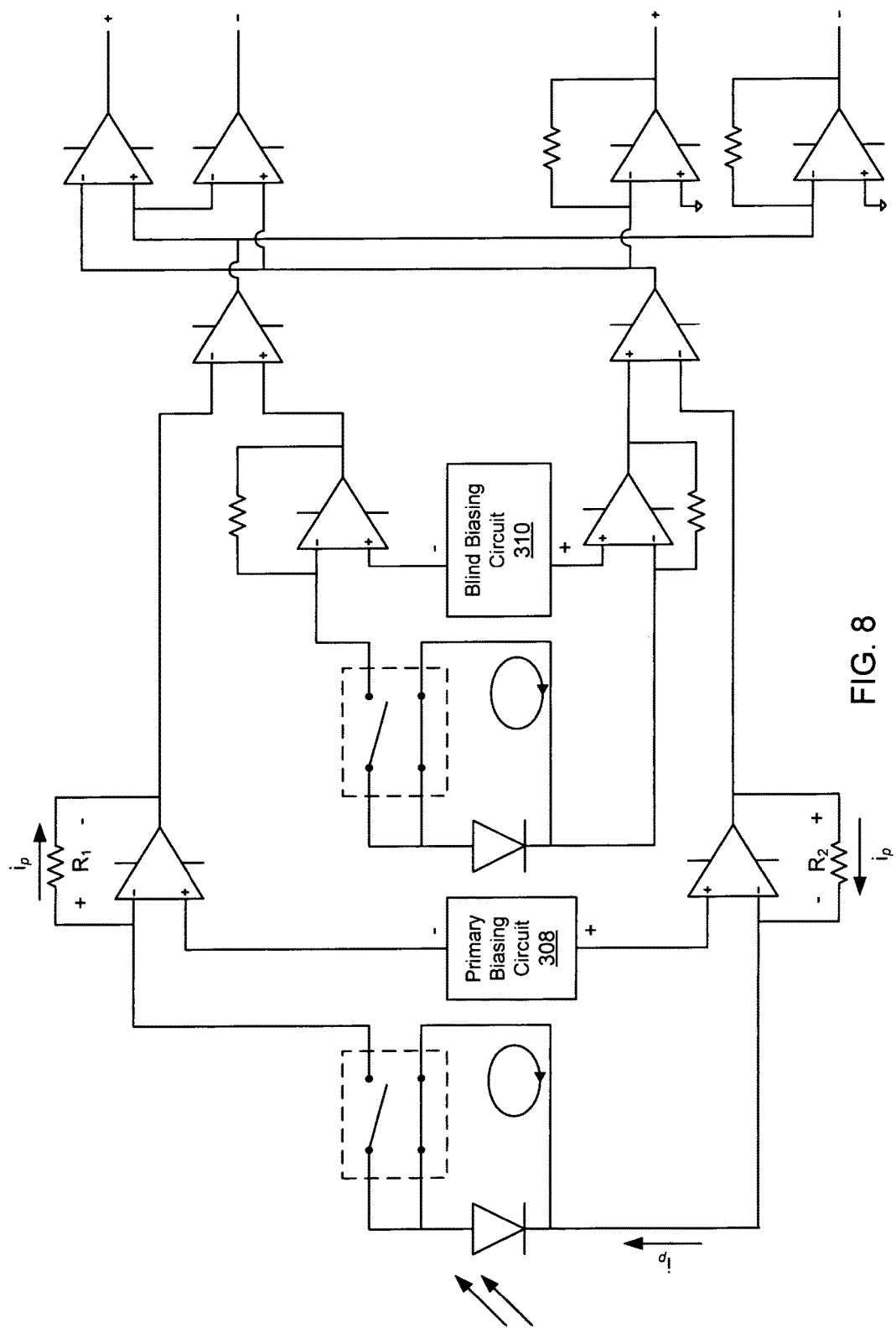
FIG. 8 illustrates the detailed view of FIG. 7, but with the states of the switches reversed.

FIG. 7 illustrates a detailed view of a fully differential amplifier circuit 800. Those features or components having similarity to features or components already discussed relative to FIGS. 3-6 can be assumed to have structure and function as previously described, especially those not described relative to FIG. 7. One difference from prior figures is that the four transinductance amplifier circuits are here shown as inverting operation amplifiers with negative feedback. Current inputs 715, 724 can be coupled to inverting inputs of the operation amplifiers 712, 720. The feedback circuits can include resistances $R_1$ and $R_2$, although in most embodiments, $R_1=R_2$. Further, it should be noted that the feedback resistances for the primary and blind stages or regions of the circuit 800 should be identical. This helps improve the accuracy of the dark offset current $i_d$ mimicking a leakage current in the primary photo detector 706.

Another detail to note is the addition of switching circuits 760, 762, and the conductive loops 772, 774. The switching circuits 760, 762 can be used to selectively switch the primary photo detector 702 and the blind photo detector 703 out of the amplifier circuit 700. The switching circuits 760, 762 can include two switches 764, 766, 768, 770 (e.g., mechanical relay, BJT, MOSFET, JFET, etc.) that can be alternatively opened and closed. When first switches 764, 768 are closed and the second switches 766, 770 are open, the primary photo detector 702 and the blind photo detector 703 are switched into the amplifier circuit 700. When the second switches 766, 770 are closed and the first switches 764, 768 are open, then the primary photo detector 704 and the blind photo detector 703 are switched out of the amplifier circuit 700 (see FIG. 8). Typically, the first switches 764, 768 are both open or both closed, and the second switches 766, 770 are both closed or both open. In an embodiment, they can even receive instructions or control from a single source or controller.

In an embodiment, a first switch 764 can selectively couple the first system input 704 to the first current input 716 of the inverting operation amplifier 712. The conductive loops 772, 774 allow current to flow in the photo detectors 702, 703 when the second switches 766, 770 are closed and the first switches 764, 768 are open. The first conductive loop 772 can be arranged between the first and second system inputs 704, 706 and can include the second switch 766 so as to selectively short the first and second system inputs 704, 706. The second conductive loop 774 can be arranged and operate in a similar manner.

When the photo detectors 702, 703 are switched out of the amplifier circuit 700, leakage current calibrations can be performed without the presence of the detectors 702, 703. For instance, the transimpedance amplifier stages in FIGS. 3-6 and the inverting operation amplifiers in FIG. 7 each generate leakage currents (or offset currents) and these leakage currents can be estimated when the detectors 702, 703 are switched out of the amplifier circuit 700. Later, during processing, voltage or current offsets associated with these calibration measurements of leakage currents existing without the detectors 702, 703 can be used to improve the accuracy of measurements.

Controllers or a controller for the switching circuits 760, 762 are not illustrated, but are envisioned as part of the disclosure.

FIG. 9 illustrates a further embodiment of a differential front-end providing two differential voltage signals to a pair of analog-to-digital converters.

Figure 10:
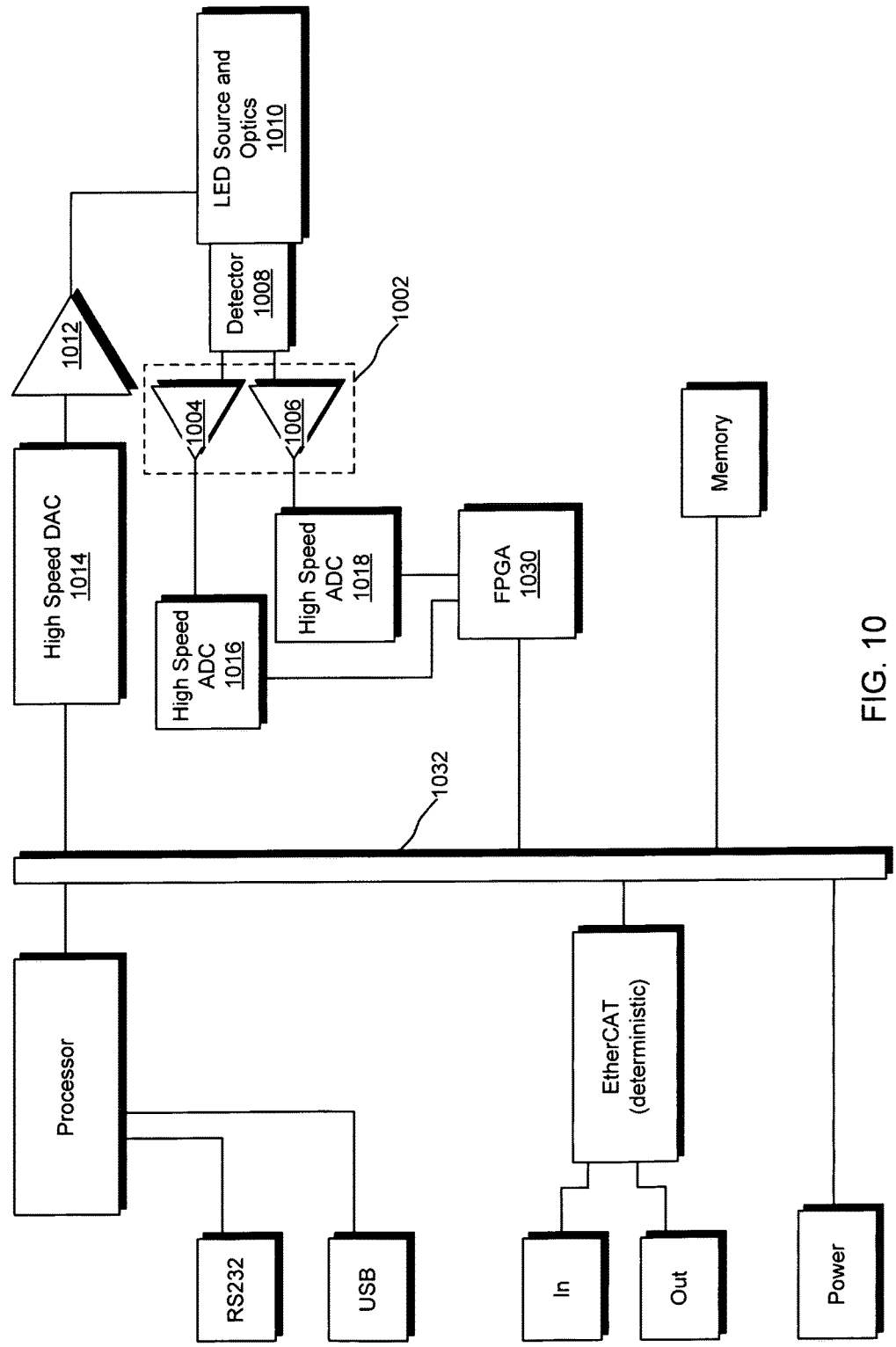
FIG. 10 illustrates an embodiment of a pyrometer system.

FIG. 10 illustrates an embodiment of a pyrometer system.

Figure 11:
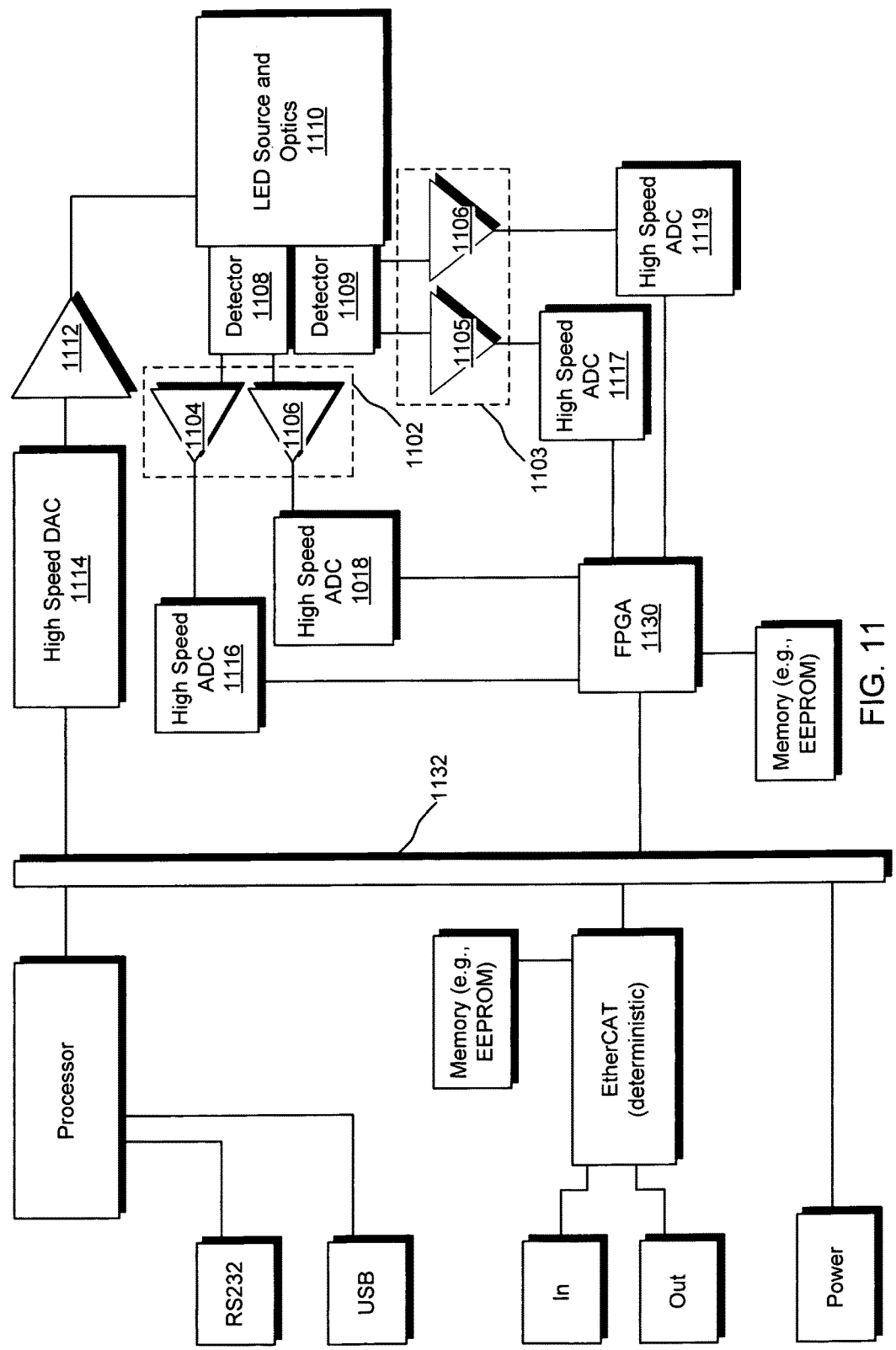
FIG. 11 illustrates another embodiment of a pyrometer system.

FIG. 11 illustrates another embodiment of a pyrometer system.

Figure 12:
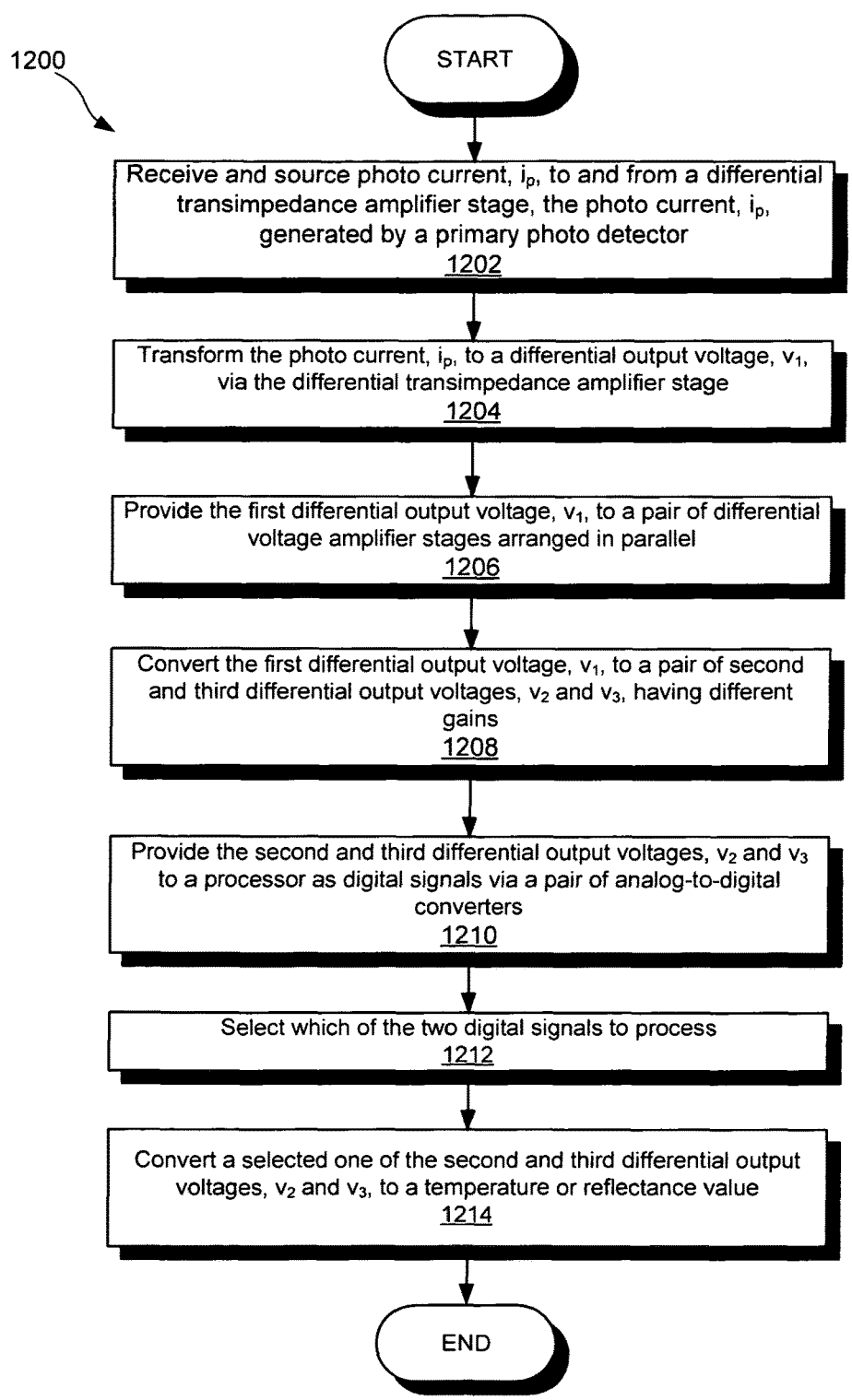
FIG. 12 illustrates a method of operating a fully-differential dual amplifier circuit.

FIG. 12 illustrates a method of operating a fully-differential dual amplifier circuit. The method 1200 can begin with the receipt and sourcing of a photo current, $i_p$, to and from a differential transimpedance amplifier stage, the photo current, $i_p$, generated by a primary photo detector (Block 1202). The amplifier circuit can then transform the photo current, $i_p$, to a differential output voltage, $v_1$, via the differential transimpedance amplifier stage (Block 1204). The differential transimpedance amplifier stage can then provide the first differential output voltage, $v_1$, to a pair of differential voltage amplifier stages arranged in parallel (Block 1206). The pair of differential voltage amplifier stages can then convert the first differential output voltage, $v_1$, to a pair of second and third differential output voltages, $v_2$ and $v_3$, having different gains (Block 1208). Two or more differential voltage amplifier stages can be used in other embodiments. The amplifier circuit can then provide the second and third differential output voltages, $v_2$ and $v_3$ to a processor as digital signals via a pair of analog-to-digital converters (Block 1210). A selector in the processor can select which of the two digital signals to process (Block 1212) without use of an electrical selector (e.g., 108 in FIG. 1) and thereby avoid stitches in the data stream. Finally, the processor can convert a selected one of the second and third differential output voltages, $v_2$ and $v_3$, to a temperature or reflectance value (Block 1214).

Figure 13:
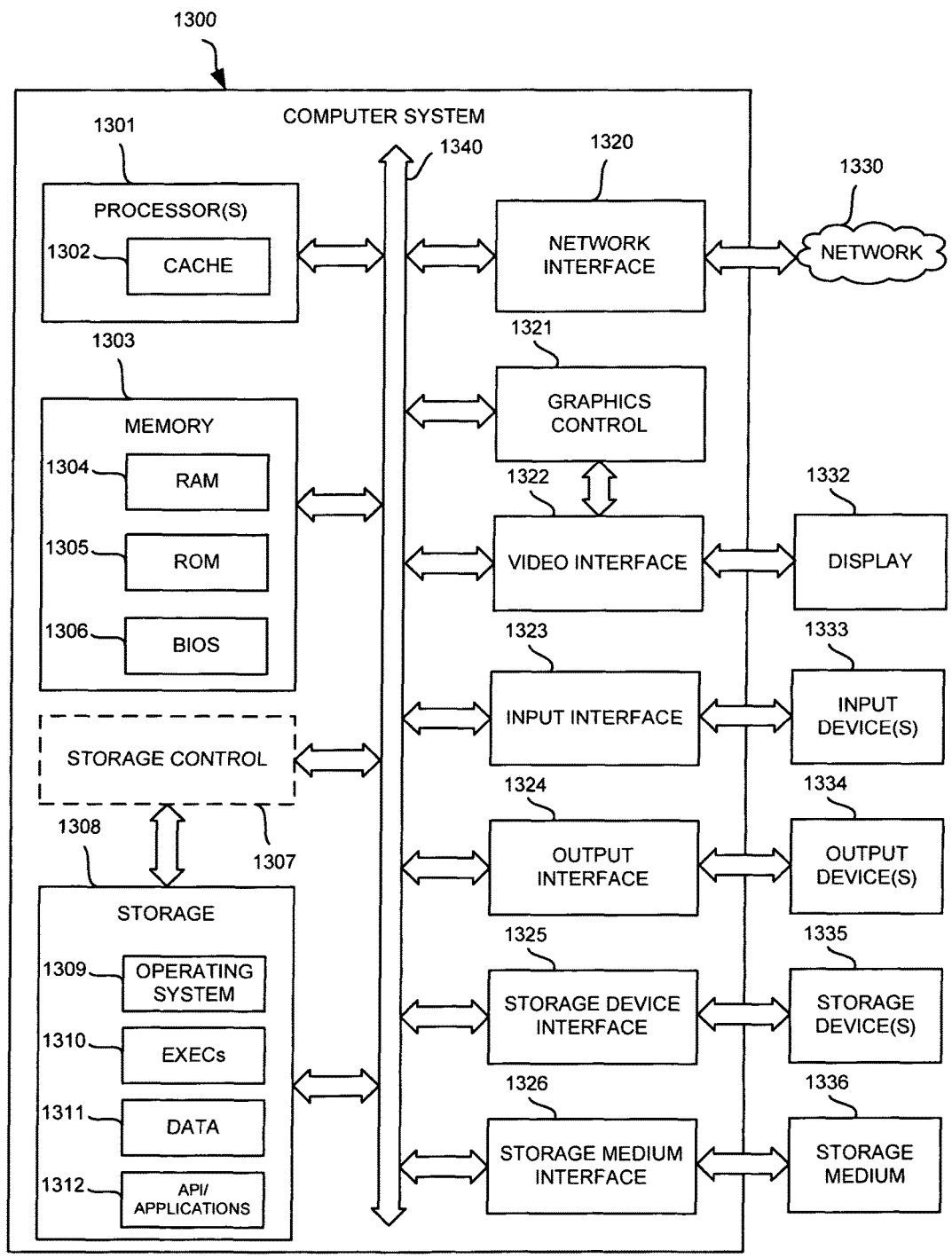
FIG. 13 shows a diagrammatic representation of one embodiment of an instrument.
Figure 14:
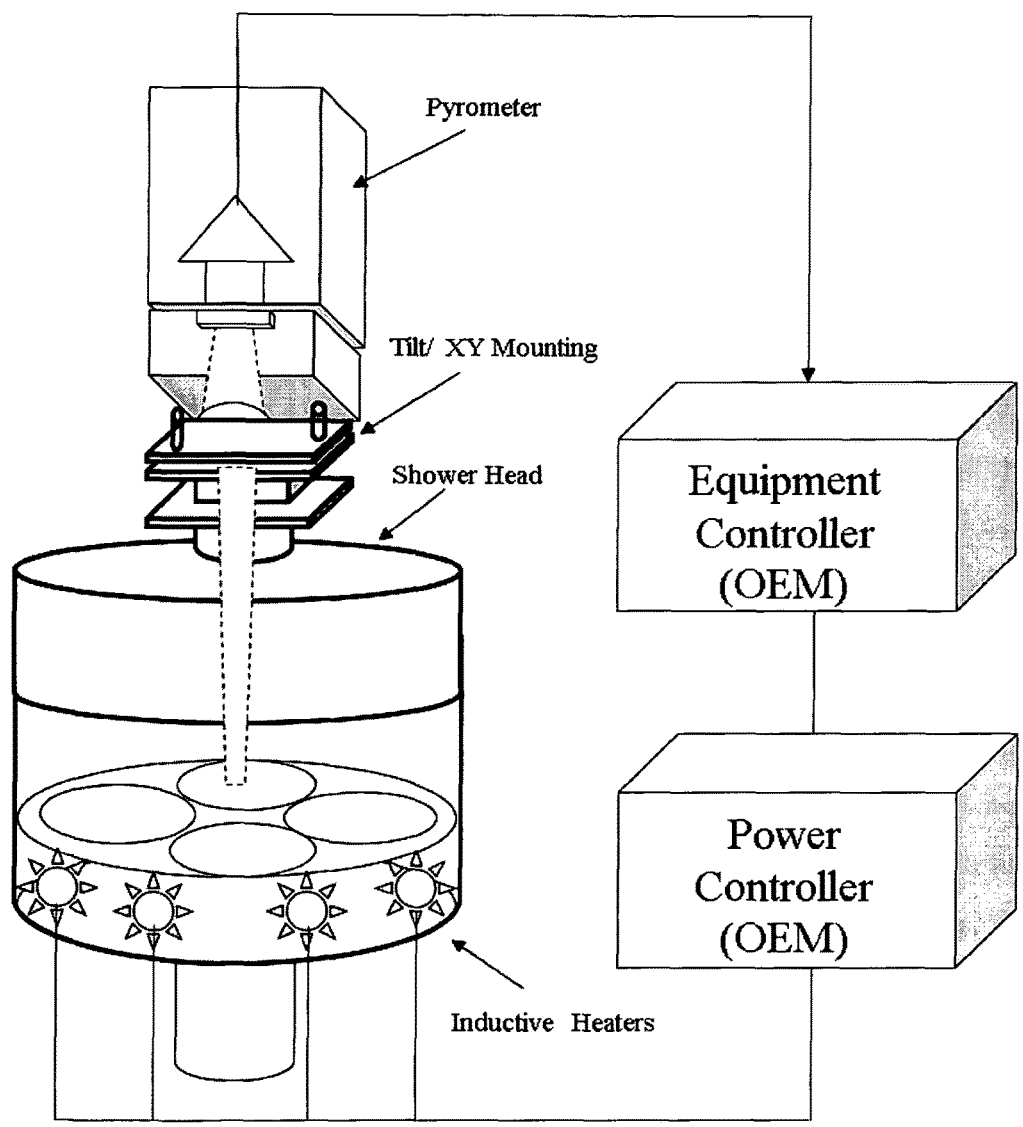
FIG. 14 illustrates a pyrometer, processing chamber, and feedback/control system for controlling heaters in a processing chamber based on feedback regarding a temperature of a target within the processing chamber.

The systems and methods described herein can be implemented in an instrument in addition to the specific physical devices described herein. FIG. 13 shows a diagrammatic representation of one embodiment of an instrument 1300 within which a set of instructions can execute for causing a device to perform or execute any one or more of the aspects and/or methodologies of the present disclosure. The components in FIG. 13 are examples only and do not limit the scope of use or functionality of any hardware, software, firmware, embedded logic component, or a combination of two or more such components implementing particular embodiments of this disclosure. Some or all of the illustrated components can be part of the instrument 1300. For instance, the instrument 1300 can be a general purpose computer (e.g., a laptop computer) or an embedded logic device (e.g., an FPGA), to name just two non-limiting examples.

Instrument 1300 includes at least a processor 1301 such as a central processing unit (CPU) and/or an FPGA to name two non-limiting examples. The instrument 1300 may also comprise a memory 1303 and a storage 1308, both communicating with each other, and with other components, via a bus 1340. The bus 1340 may also link a display 1332, one or more input devices 1333 (which may, for example, include a keypad, a keyboard, a mouse, a stylus, etc.), one or more output devices 1334, one or more storage devices 1335, and various non-transitory, tangible computer-readable storage media 1336 with each other and with one or more of the processor 1301, the memory 1303, and the storage 1308. All of these elements may interface directly or via one or more interfaces or adaptors to the bus 1340. For instance, the various non-transitory, tangible computer-readable storage media 1336 can interface with the bus 1340 via storage medium interface 1326. Instrument 1300 may have any suitable physical form, including but not limited to one or more integrated circuits (ICs), printed circuit boards (PCBs), mobile handheld devices (such as mobile telephones or PDAs), laptop or notebook computers, distributed instruments, computing grids, or servers.

Processor(s) 1301 (or central processing unit(s) (CPU(s))) optionally contains a cache memory unit 1302 for temporary local storage of instructions, data, or computer addresses. Processor(s) 1301 are configured to assist in execution of computer-readable instructions stored on at least one non-transitory, tangible computer-readable storage medium. Instrument 1300 may provide functionality as a result of the processor(s) 1301 executing software embodied in one or more non-transitory, tangible computer-readable storage media, such as memory 1303, storage 1308, storage devices 1335, and/or storage medium 1336 (e.g., read only memory (ROM)). The non-transitory, tangible computer-readable storage media may store software that implements particular embodiments, and processor(s) 1301 may execute the software. Memory 1303 may read the software from one or more other non-transitory, tangible computer-readable storage media (such as mass storage device(s) 1335, 1336) or from one or more other sources through a suitable interface, such as network interface 1320. The software may cause processor(s) 1301 to carry out one or more processes or one or more steps of one or more processes described or illustrated herein. Carrying out such processes or steps may include defining data structures stored in memory 1303 and modifying the data structures as directed by the software. In some embodiments, an FPGA can store instructions for carrying out functionality as described in this disclosure. In other embodiments, firmware includes instructions for carrying out functionality as described in this disclosure.

The memory 1303 may include various components (e.g., non-transitory, tangible computer-readable storage media) including, but not limited to, a random access memory component (e.g., RAM 1304) (e.g., a static RAM "SRAM", a dynamic RAM "DRAM, etc.), a read-only component (e.g., ROM 1305), and any combinations thereof. ROM 1305 may act to communicate data and instructions unidirectionally to processor(s) 1301, and RAM 1304 may act to communicate data and instructions bidirectionally with processor(s) 1301. ROM 1305 and RAM 1304 may include any suitable non-transitory, tangible computer-readable storage media described below. In some instances, ROM 1305 and RAM 1304 include non-transitory, tangible computer-readable storage media for carrying out the method 1200. In one example, a basic input/output system 1306 (BIOS), including basic routines that help to transfer information between elements within instrument 1300, such as during start-up, may be stored in the memory 1303.

Fixed storage 1308 is connected bidirectionally to processor(s) 1301, optionally through storage control unit 1307. Fixed storage 1308 provides additional data storage capacity and may also include any suitable non-transitory, tangible computer-readable media described herein. Storage 1308 may be used to store operating system 1309, EXECs 1310 (executables), data 1311, API applications 1312 (application programs), and the like. For instance, the storage 1308 could be implemented for storage of offsets. Often, although not always, storage 1308 is a secondary storage medium (such as a hard disk) that is slower than primary storage (e.g., memory 1303). Storage 1308 can also include an optical disk drive, a solid-state memory device (e.g., flash-based systems), or a combination of any of the above. Information in storage 1308 may, in appropriate cases, be incorporated as virtual memory in memory 1303.

In one example, storage device(s) 1335 may be removably interfaced with instrument 1300 (e.g., via an external port connector (not shown)) via a storage device interface 1325. Particularly, storage device(s) 1335 and an associated machine-readable medium may provide nonvolatile and/or volatile storage of machine-readable instructions, data structures, program modules, and/or other data for the instrument 1300. In one example, software may reside, completely or partially, within a machine-readable medium on storage device(s) 1335. In another example, software may reside, completely or partially, within processor(s) 1301.

Bus 1340 connects a wide variety of subsystems. Herein, reference to a bus may encompass one or more digital signal lines serving a common function, where appropriate. Bus 1340 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Instrument 1300 may also include an input device 1333. In one example, a user of instrument 1300 may enter commands and/or other information into instrument 1300 via input device(s) 1333. Examples of an input device(s) 1333 include, but are not limited to, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 1333 may be interfaced to bus 1340 via any of a variety of input interfaces 1323 (e.g., input interface 1323) including, but not limited to, serial, parallel, game port, USB, FIREWIRE, THUNDERBOLT, or any combination of the above.

In particular embodiments, when instrument 1300 is connected to network 1330, instrument 1300 may communicate with other devices, such as mobile devices and enterprise systems, connected to network 1330. Communications to and from instrument 1300 may be sent through network interface 1320. For example, network interface 1320 may receive incoming communications (such as requests or responses from other devices) in the form of one or more packets (such as Internet Protocol (IP) packets) from network 1330, and instrument 1300 may store the incoming communications in memory 1303 for processing. Instrument 1300 may similarly store outgoing communications (such as requests or responses to other devices) in the form of one or more packets in memory 1303 and communicated to network 1330 from network interface 1320. Processor(s) 1301 may access these communication packets stored in memory 1303 for processing.

Examples of the network interface 1320 include, but are not limited to, a network interface card, a modem, and any combination thereof. Examples of a network 1330 or network segment 1330 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 1330, may employ a wired and/or a wireless mode of communication. In general, any network topology may be used.

Information and data can be displayed through a display 1332. Examples of a display 1332 include, but are not limited to, a liquid crystal display (LCD), an organic liquid crystal display (OLED), a cathode ray tube (CRT), a plasma display, and any combinations thereof. The display 1332 can interface to the processor(s) 1301, memory 1303, and fixed storage 1308, as well as other devices, such as input device(s) 1333, via the bus 1340. The display 1332 is linked to the bus 1340 via a video interface 1322, and transport of data between the display 1332 and the bus 1340 can be controlled via the graphics control 1321.

In addition to a display 1332, instrument 1300 may include one or more other peripheral output devices 1334 including, but not limited to, an audio speaker, a printer, and any combinations thereof. Such peripheral output devices may be connected to the bus 1340 via an output interface 1324. Examples of an output interface 1324 include, but are not limited to, a serial port, a parallel connection, a USB port, a FIREWIRE port, a THUNDERBOLT port, and any combinations thereof.

In addition or as an alternative, instrument 1300 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a non-transitory, tangible computer-readable medium may encompass a circuit (such as an IC) storing software for execution, a circuit embodying logic for execution, or both, where appropriate. For instance, a non-transitory, tangible computer-readable medium may encompass one or more FPGAs, fixed logic, analogue logic, or some combination of the above. The present disclosure encompasses any suitable combination of hardware, software, or both.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Within this specification, the same reference characters are used to refer to terminals, signal lines, wires, etc. and their corresponding signals. In this regard, the terms "signal," "wire," "connection," "terminal," and "pin" may be used interchangeably, from time-to-time, within the this specification. It also should be appreciated that the terms "signal," "wire," or the like can represent one or more signals, e.g., the conveyance of a single bit through a single wire or the conveyance of multiple parallel bits through multiple parallel wires. Further, each wire or signal may represent bi-directional communication between two, or more, components connected by a signal or wire as the case may be.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, or microcontroller. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, a software module implemented as digital logic devices, or in a combination of these. A software module may reside in RAM memory, flash memory, ROM memory, EPROM memory, EEPROM memory, registers, hard disk, a removable disk, a CD-ROM, or any other form of non-transitory, tangible computer-readable storage medium known in the art. An exemplary non-transitory, tangible computer-readable storage medium is coupled to the processor such that the processor can read information from, and write information to, the non-transitory, tangible computer-readable storage medium. In the alternative, the non-transitory, tangible computer-readable storage medium may be integral to the processor. The processor and the non-transitory, tangible computer-readable storage medium may reside in an ASIC. The ASIC may reside in a user terminal. In the alternative, the processor and the non-transitory, tangible computer-readable storage medium may reside as discrete components in a user terminal. In some embodiments, a software module may be implemented as digital logic components such as those in an FPGA once programmed with the software module.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A high speed, high signal-to-noise, high gain, low-offset, and high dynamic range fully-differential amplifier circuit for amplifying an optical signal in a pyrometer, the amplifier circuit comprising:
 a first system input configured for coupling to an anode of a primary photo detector;
 a second system input configured for coupling to a cathode of the primary photo detector,
 wherein, when the first and second system inputs are coupled to the primary photo detector, a photo current, $i_p$, passes between the second and first system inputs;
 a transimpedance differential amplifier stage comprising:
  a primary biasing circuit configured to bias the primary photo detector with between 0V and a reverse bias, and having a first and second output;
  a first transimpedance amplifier circuit having a first current input and a first transimpedance voltage output, wherein:
   the first current input is coupled to the first system input,
   a first bias voltage input is coupled to the first output of the primary biasing circuit, and
   a first voltage at the first voltage transimpedance output is proportional to the photo current, $i_p$; and a second transimpedance amplifier circuit having a second current input and a second transimpedance voltage output, wherein:
the second current input is coupled to the second system input,
a second bias voltage input is coupled to the second output of the primary biasing circuit, and
a second voltage at the second voltage transimpedance output is proportional to the photo current, $i_p$, passing between the second and first system inputs;
wherein the primary biasing circuit is coupled to the first and second transimpedance amplifier circuits so as to cause a 0V to a reverse bias to exist across the primary photo detector; and
a primary differential output voltage, $v_1$, being a difference between the first and second transimpedance voltage outputs, is configured for conversion to a temperature or reflectance value in a processor.

2. The fully-differential amplifier circuit of claim 1, further comprising two or more differential voltage amplifier stages each comprising two differential voltage amplifiers arranged in parallel, each of the two or more differential voltage amplifier stages having a differential voltage output, $v_2, v_3$.

3. The fully-differential amplifier circuit of claim 2, wherein each of the two differential voltage amplifiers in one of the two or more differential voltage amplifier stages are coupled to the differential output of the transimpedance differential amplifier stage.

4. The fully-differential amplifier circuit of claim 3, wherein one leg of the differential output of the transimpedance differential amplifier stage is coupled to an inverting input of one of the two differential voltage amplifiers in the one of the two or more differential voltage amplifier stages and a non-inverting input of the other of the two differential voltage amplifiers in the one of the two or more differential voltage amplifier stages, thereby generating twice the gain of a pair of differential amplifiers where the inputs were not inverted.

5. The fully-differential amplifier circuit of claim 2, wherein the two or more differential voltage amplifier stages have different gains.

6. The fully-differential amplifier circuit of claim 5, wherein the two or more differential voltage amplifier stages are configured for coupling to a processor having a software selector configured for selecting between outputs of the two or more differential voltage amplifier stages such that selection of amplification gain can be performed during data collection without use of an electrical switch and therefore without perturbation in a data stream.

7. The fully-differential amplifier circuit of claim 1, further comprising a blind stage comprising:
a blind photo detector isolated from most photonic emissions seen by the primary photo detector, but otherwise structurally identical to the primary photo detector;
a blind biasing circuit coupled to voltage inputs of a third transimpedance amplifier circuit and a fourth transimpedance amplifier circuit and configured to bias the blind photo detector with an equivalent magnitude bias to the bias that exists across the primary photo detector, wherein the blind photo detector represents a leakage current of the primary photo detector; and
a blind differential voltage output, $v_4$, configured for subtraction from the primary differential output $v_1$.

8. The fully-differential amplifier circuit of claim 7, further comprising a pair of comparators each having a pair of differential inputs and coupled to the primary differential voltage output, $v_1$, and the blind differential voltage output, $v_4$, the comparators having polarities such that a differential output, $v_5$, of the pair of comparators is equal to a difference between the primary differential voltage output, $v_1$, and the blind differential voltage output, $v_4$.

9. The fully-differential amplifier circuit of claim 1, further comprising:
a first switch selectively coupling the first system input to the first current input of the first transimpedance amplifier circuit; and
a conductive loop between the first and second system inputs, the conductive loop including a second switch selectively shorting the first and second system inputs,
wherein the first switch and the second switch are alternatively switched, such that the primary photo detector is selectively switched out of the fully-differential amplifier circuit thereby allowing leakage current calibrations to be performed without the presence of the primary photo detector.

10. A pyrometer system comprising:
a primary photo detector;
a differential amplifier circuit comprising a pair of transimpedance amplifiers coupled to the primary photo detector and having two differential voltage outputs proportional to a photo current, $i_p$, generated by the primary photo detector, but having different gains;
a first analogue-to-digital converter coupled to a first of the two differential voltage outputs, and configured to transform a first differential voltage output into a corresponding digital value, and having a first digital output that provides the corresponding digital value to a processor;
a second analogue to digital converter coupled to a second of the two differential voltage outputs, and configured to transform a second differential voltage output into a corresponding digital value, and having a second digital output that provides the corresponding digital value to the processor; and
the processor coupled to the first and second digital outputs, having a selector coupled to the first and second digital outputs and configured to select which of the first and second digital outputs is to be processed by the processor, the processor configured to transform a selected of the first and second digital outputs into a temperature or reflectance value, and having an output that provides the temperature or reflectance value.

11. The pyrometer system of claim 10, wherein the differential amplifier circuit (202) includes a primary bias circuit arranged to cause a bias on the primary photo detector 201, where the bias can range from 0V to a reverse bias.

12. A method of operating a differential amplifier circuit, the method comprising:
receiving and sourcing a photo current, $i_p$, at a differential transimpedance amplifier stage, the photo current generated by a primary photo detector;
transforming the photo current, $i_p$, to a differential output voltage, $v_1$, via the differential transimpedance amplifier stage;
providing the first differential output voltage, $v_1$, to a pair of differential voltage amplifier stages arranged in parallel thereby converting the first differential output voltage, $v_1$, to a pair of second and third differential output voltages, $v_2$ and $v_3$, having different gain;
providing the second and third differential output voltages, $v_2$ and $v_3$ to a processor as digital signals via a pair of analog-to-digital converters;

selecting one of the second and third differential output voltages, $v_2$ and $v_3$, for processing without an electrical switch;

converting a selected one of the second and third differential output voltages, $v_2$ and $v_3$, to a temperature or reflectance value.

13. The method of claim 12, further comprising:

receiving a dark offset current, $i_d$, through a blind photo detector to a blind stage comprising a second pair of transimpedance amplifier circuits arranged in parallel;

transforming the dark offset current, $i_d$, to a fourth differential output voltage, $v_4$, via the blind stage, the blind photo detector representing a leakage current in the primary photo detector;

subtracting the fourth differential output voltage, $v_4$, from the first differential output voltage, $v_1$, to form a fifth differential output voltage, $v_5$; and providing the fifth differential output voltage, $v_5$, to the pair of differential voltage amplifier stages;

converting the fifth differential output voltage, $v_5$, to the second and third differential output voltages, $v_2$ and $v_3$; and converting a selected of the second and third differential output voltages, $v_2$ and $v_3$, into a temperature or reflectance value, the subtracting using the dark offset current, $i_d$, to account for leakage current in the primary photo detector.

14. The method of claim 12, further comprising:

selectively removing the primary photo detector and the blind photo detector from the differential amplifier circuit via two switching circuits;

determining offset currents in the differential amplifier circuit without the influence of the primary photo detector; and subtracting the offset currents from the primary photo current, ip, determined based on the selected one of the second or third differential output voltages, $v_2$ and $v_3$, the subtracting occurring in the processor.

15. The method of claim 12, further comprising biasing the primary photo detector with a primary bias between and including 0V to a reverse bias, and biasing the blind photo detector with a blind bias having the same magnitude as the primary bias.

16. The method of claim 12, further comprising biasing the primary photo detector with a primary bias between and including 0V to a reverse bias, and biasing the blind photo detector with a blind bias having the same magnitude as the primary bias.

17. The method of claim 12, wherein the differential transimpedance differential amplifier stage comprises a first pair of transimpedance amplifier circuits arranged in parallel, one of these receiving the photo current and one sourcing the photo current.

* * * * *